(12) United States Patent
Yamada et al.

(10) Patent No.: US 8,177,280 B2
(45) Date of Patent: May 15, 2012

(54) VEHICLE SEAT DEVICE

(75) Inventors: Yukifumi Yamada, Toyota (JP); Sadao Ito, Anjo (JP)

(73) Assignee: Aisin Seiki Kabushiki Kaisha, Kariya-Shi, Aichi-Ken (JP)

(*) Notice: Subject to any disclaimer, the term of this patent is extended or adjusted under 35 U.S.C. 154(b) by 25 days.

(21) Appl. No.: 12/675,893

(22) PCT Filed: Nov. 4, 2008

(86) PCT No.: PCT/JP2008/070067
§ 371 (c)(1),
(2), (4) Date: Mar. 1, 2010

(87) PCT Pub. No.: WO2009/063777
PCT Pub. Date: May 22, 2009

(65) Prior Publication Data
US 2010/0253110 A1 Oct. 7, 2010

(30) Foreign Application Priority Data
Nov. 16, 2007 (JP) .................. 2007-297547

(51) Int. Cl.
*B60N 2/14* (2006.01)

(52) U.S. Cl. ............. 296/65.05; 296/65.08; 297/344.15; 297/344.17

(58) Field of Classification Search ............... 296/65.01, 296/65.05, 65.08, 65.13, 65.18, 68.1; 297/313, 297/284.7, 284.11, 344.15, 344.17
See application file for complete search history.

(56) References Cited

U.S. PATENT DOCUMENTS

| | | | |
|---|---|---|---|
| 4,767,156 A | * | 8/1988 | Yamada et al. ............... 297/313 |
| 4,787,594 A | * | 11/1988 | Ikegaya et al. ............... 248/421 |
| 6,921,058 B2 | | 7/2005 | Becker et al. |
| 2003/0230695 A1 | | 12/2003 | Becker et al. |

(Continued)

FOREIGN PATENT DOCUMENTS
DE 2 028 135 2/1971
(Continued)

OTHER PUBLICATIONS

Supplementary Search Report dated Feb. 25, 2011, issued by the European Patent Office in corresponding European Patent Application No. 08850528, and European Search Opinion.

(Continued)

*Primary Examiner* — Dennis Pedder
*Assistant Examiner* — Jason S Daniels
(74) *Attorney, Agent, or Firm* — Buchanan Ingersoll & Rooney PC

(57) ABSTRACT

A vehicle seat device is designed to perform tilt adjustment of a seat cushion in a construction which is high in rigidity, downsized and high in the quality of external appearance. The device comprises rotational links; floor attached front brackets and front swing links which make couplings between first joint portions of the rotational links and upper rails; flank brackets coupled to the rotational links at front portion thereof; floor attached rear brackets and rear swing links which make couplings between rear portions of the flank brackets and the upper rails; a front drive device secured to one of the flank brackets for rotationally driving the rotational links; and cushion frames coupled to the flank brackets and second joint portions of the rotational links respectively at rear portions and front portions thereof. The second joint portions and the cushion frames are coupled to respective both ends of cushion frame swing links.

12 Claims, 5 Drawing Sheets

U.S. PATENT DOCUMENTS

2009/0206643 A1 * 8/2009 Yamamoto .................. 297/313

FOREIGN PATENT DOCUMENTS

| DE | 40 08 662 A1 | 9/1991 |
|---|---|---|
| DE | 197 26 680 A1 | 1/1999 |
| DE | 102 26 717 A1 | 1/2004 |
| FR | 2 897 024 A1 | 8/2007 |
| GB | 1 307 749 | 2/1973 |
| JP | 56-248 B2 | 1/1981 |
| JP | 2002-321551 A | 11/2002 |
| JP | 2005-028955 A | 2/2005 |

OTHER PUBLICATIONS

International Search Report issued by the Japanese Patent Office on Nov. 16, 2008 as the International Searching Authority in International Application No. PCT/JP2008/070067.

* cited by examiner

VEHICLE SEAT DEVICE

TECHNOLOGICAL FIELD

The present invention relates to a vehicle seat device capable of performing tilt adjustment by moving up and down a front portion of a seat cushion which has a seat facing the buttocks of a user.

BACKGROUND ART

Heretofore, as vehicle seat devices in the prior art, Patent Document 1 discloses one which is provided with a rotational link (62) coupled rotatably to a lifter front link (22) and a swing link (64) coupled relatively rotatably to the rotational link (62) at its one end, wherein a cushion is shaft-supported at the other end of the swing link (64) and wherein the tilt adjustment of the cushion can be made by rotating the rotational link (62) by a drive device attached to the lifter front link (22).

Further, Patent Document 2 discloses one in which a drive mechanism 215 of a front vertical mechanism (201) and a drive mechanism (351) of a rear vertical mechanism (301) are provided at different heights and are arranged so that as viewed from above, at least one part of the drive mechanism 215 of the front vertical mechanism (201) overlaps one part of the drive mechanism (351) of the rear vertical mechanism (301).

Patent Document 1: German Patent Application Publication No. 10226717 Specification (FIG. 1 etc.)
Patent Document 2: JP2005-028955 A (FIG. 1 etc.)

DISCLOSURE OF THE INVENTION

Problems to be Solved by the Invention

However, in the vehicle seat device in Patent Document 1, since the drive mechanism and the rotational link (62) are arranged on the lifter front link (22), the lifter front link (22) becomes very large and needs a large peripheral space for rotation. Then, since the rotational link (62) determines the range of the tilt adjustment in proportion to the length between two points including its rotational center and a coupling portion to the swing link (64), the rotational link (62) has to be enlarged for a larger adjustment range of the tilt adjustment and thus, is difficult to obtain a sufficient rigidity thereof. Further, because the construction is such that a cushion frame is moved up and down through the rotational link (62) and the swing link (64) relative to the lifter front link (22) which is rotatably coupled to a front end portion of a seat carrier (26) to regulate the height of the same, a large vertical movement causes the space between the seat carrier (26) and the cushion frame to increase, whereby flanks and a bottom portion of the seat of the cushion are exposed to deteriorate the quality of external appearance. Further, because of also incorporating a mechanism for adjusting the length of a seat cushion, the vehicle seat device in Patent Document 2 results in having many rotational support portions as a whole and is not sufficient in the rigidity in supporting the cushion frame in the vertical direction and the forward-rearward direction.

The present invention has been completed with the foregoing circumstances taken into consideration and takes it as a problem to be solved to provide a vehicle seat device which is capable of realizing high rigidity, downsizing and high quality of external appearance in employing a mechanism for performing tilt adjustment of a seat cushion.

Means for Solving the Problems

The feature of a vehicle seat device in a first aspect for solving the foregoing problems resides in comprising flank brackets adapted to support a seat cushion and rotatably coupled at rear portions to floor attached rear brackets; rotational links rotatably supported at center portions on front portions of the flank brackets; a front drive device for relatively rotating the rotational links relative to the flank brackets; cushion frames for the seat cushion, having rear end portions rotatably coupled to center portions of the flank brackets and having front end portions coupled to second joint portions ahead of the center portions of the rotational links to be restricted from relative movement in a vertical direction and to be relatively movable in a forward-rearward direction; and floor attached front brackets having one ends coupled to first joint portions behind the center portions of the rotational links to be restricted from relative movement in the vertical direction and to be relatively movable in the forward-rearward direction.

The feature of the vehicle seat device in a second aspect resides in that in the first aspect, the second joint portions and the cushion frames are relatively rotatably coupled through cushion frame swing links.

The feature of the vehicle seat device in a third aspect resides in that in the first or second aspect, the first joint portions and the floor attached front brackets are relatively rotatably coupled through front swing links.

The feature of the vehicle seat device in a fourth aspect resides in that in any one of the first to third aspects, the device further comprises rear swing links rotatably coupled at one ends to the rear portions of the flank brackets and rotatably coupled at the other ends to the floor attached rear brackets in order to rotatably couple the rear portions of the flank brackets to the floor attached rear brackets; and a rear drive device for relatively rotating the rear swing links relative to the flank brackets.

The feature of the vehicle seat device in a fifth aspect resides in that in the fourth aspect, the rear drive device relatively rotates the rear swing links relative to the flank brackets in connection with the operation of the front drive device.

The feature of the vehicle seat device in a sixth aspect resides in that in the fifth aspect, the rear drive device is operated in connection with the operation of the front drive device to diminish the vertical movement of the coupling portions between the rear end portions of the cushion frames and the flank brackets.

Effects of the Invention

According to the invention described in the first aspect, by providing features to the rotational links which are used to realize a tilt mechanism for the cushion of the vehicle seat device, it becomes possible to realize improved rigidity, downsizing and improved quality of external appearance.

When the rotational links are rotated by the front drive device, the rotational links rotationally move downward the first joint portions located behind the rotational centers and rotationally move upward the second joint portions located ahead of the rotational centers. As a result that the first joint portions push the floor attached front brackets downward, the front end portions of the flank brackets are moved upward. And, the second joint portions push the front end portions of the cushion frames upward. In this way, by distributing the adjustment range of the tilt mechanism to respective joint portions by the effective use of three points including the center portions, the first joint portions and the second joint portions, the length from the rotational center of each rotational link to respective joint portions can be shortened in comparison with those in the prior art that realizes a tilt mechanism by two points on a rotational link, so that the rigidity can be improved. Further, even in the case of realizing the same adjusting range, it becomes possible to effectively utilize the length of the rotational links in comparison with the prior art, and therefore, it is possible to realize downsizing and to make the dimensions small as a whole. In addition, the cushion frames are varied in angle with the flank brackets taken as reference, and the flank brackets are also varied in angle in dependence on the movement of the cushion frames. Thus, when the angle of the cushion frames is varied largely, the angle of the flank brackets is also varied to a small degree, and thus, the spaces between the cushion frames and the flank brackets can be made to be smaller relatively in comparison with the prior art. Furthermore, by altering the ratio between the length from the first joint portion to the second joint portion on each rotational link and the length of the first joint portion to the rotational center, it is possible to adjust the ratio between the variation in angle of the cushion frames and the variation in angle of the flank brackets, so that an appropriate moving amount can easily be set. Accordingly, there can be made little a likelihood that the spaces between the cushion frames and the flank brackets and the lower part of the device are exposed outside, so that the quality of external appearance can be improved.

According to the inventions described in the second and third aspects, by using the front swing links which couple the first joint portions to the floor attached front brackets and the cushion frame swing links which couple the second joints to the cushion frames, it is possible to suppress the ricketiness of the seat cushion at the time of use.

According to the invention described in the fourth aspect, by using the rear swing links which couple the flank brackets to the floor attached rear brackets, it also becomes possible to adjust the height at the rear portion of the seat cushion.

According to the invention described in the fifth aspect, since there is used a construction that relatively rotates the rear swing links relative to the flank brackets to move in connection with the operation of the front drive device, it becomes possible to properly control the movement of rear end portions of the cushion frames in dependence on the movement of the front end portions thereof. In particular, like the invention described in the sixth aspect, by making the rear drive device to operate in connection with the operation of the front drive device so that the coupling portions of the cushion frames to the flank brackets are made to be small in the vertical movement, it is possible to decrease an unpleasant feeling felt by the user.

DESCRIPTION OF REFERENCE SYMBOLS

Figure 1:
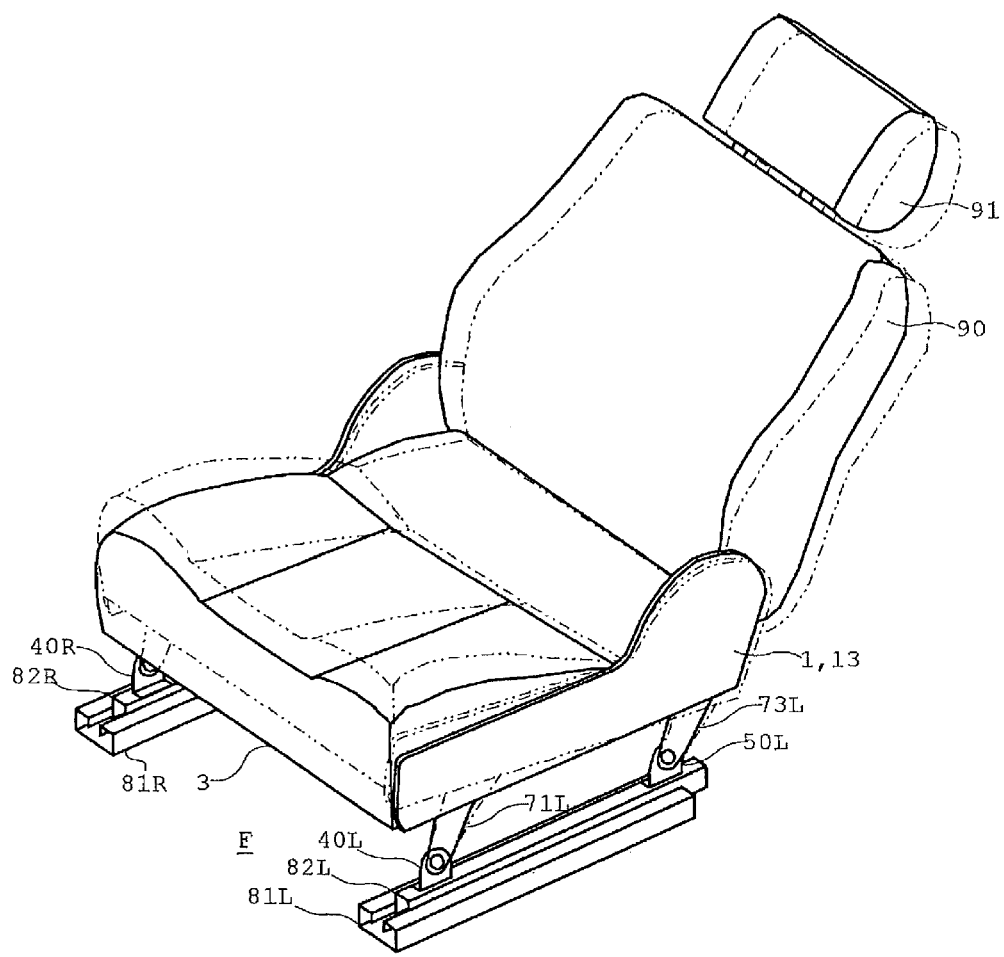
FIG. 1 is a perspective view showing a vehicle seat device in an embodiment according to the present invention.

1 . . . flank holding member
3 . . . seat cushion
10 . . . flank bracket
20 . . . rotational link
21 . . . rotational center
22 . . . first joint portion
23 . . . second joint portion
24 . . . sector gear
30 . . . cushion frame
40 . . . floor attached front bracket
50 . . . floor attached rear bracket
60, 63 . . . motors
61, 64 . . . reduction mechanisms
62, 65 . . . pinion gears
71 . . . front swing link
72 . . . cushion frame swing link
73 . . . rear swing link
81 . . . lower rail
82 . . . upper rail
90 . . . seatback
91 . . . headrest

PREFERRED EMBODIMENT FOR PRACTICING THE INVENTION (Construction)

An embodiment of the present invention will be described with reference to the drawings. As shown in FIG. 1, a vehicle seat device in the present embodiment has a seat cushion 3 for supporting the buttocks of a user, flank holding members 1 holding the seat cushion 3 at the flanks, a seatback 90 for holding the back of the user, a headrest 91 for supporting the head of the user, floor attached front brackets 40 and floor attached rear brackets 50. The seat cushion 3 is rotatably held by the flank holding members 1 at its rear portion. The seatback 90 is rotatably held by the rear portions of the flank holding members 1 at its lower portion. The headrest 91 is held at an upper portion of the seatback 90.

The present vehicle seat device is held on a vehicle floor F by the floor attached front brackets 40 and the floor attached rear brackets 50 through a slide mechanism. The floor attached front brackets 40 and the floor attached rear brackets 50 are fixed to upper rails 82 of the slide mechanism comprising lower rails 81 and the upper rails 82. The lower rails 81 are fixed to the floor F, and as a result that the upper rails 82 which are arranged to be slidable relative to the lower rails 81 in the vehicle forward-rearward direction are slidden in the vehicle forward-rearward direction, the position of the vehicle seat device is adjustable on the floor F in the vehicle forward-rearward direction.

Description will be made regarding interior mechanisms which are provided in parts of the flank holding members 1 for moving the seat cushion 3 of the present vehicle seat device and a front portion of the seat cushion 3 in the vertical direction.

Figure 2:
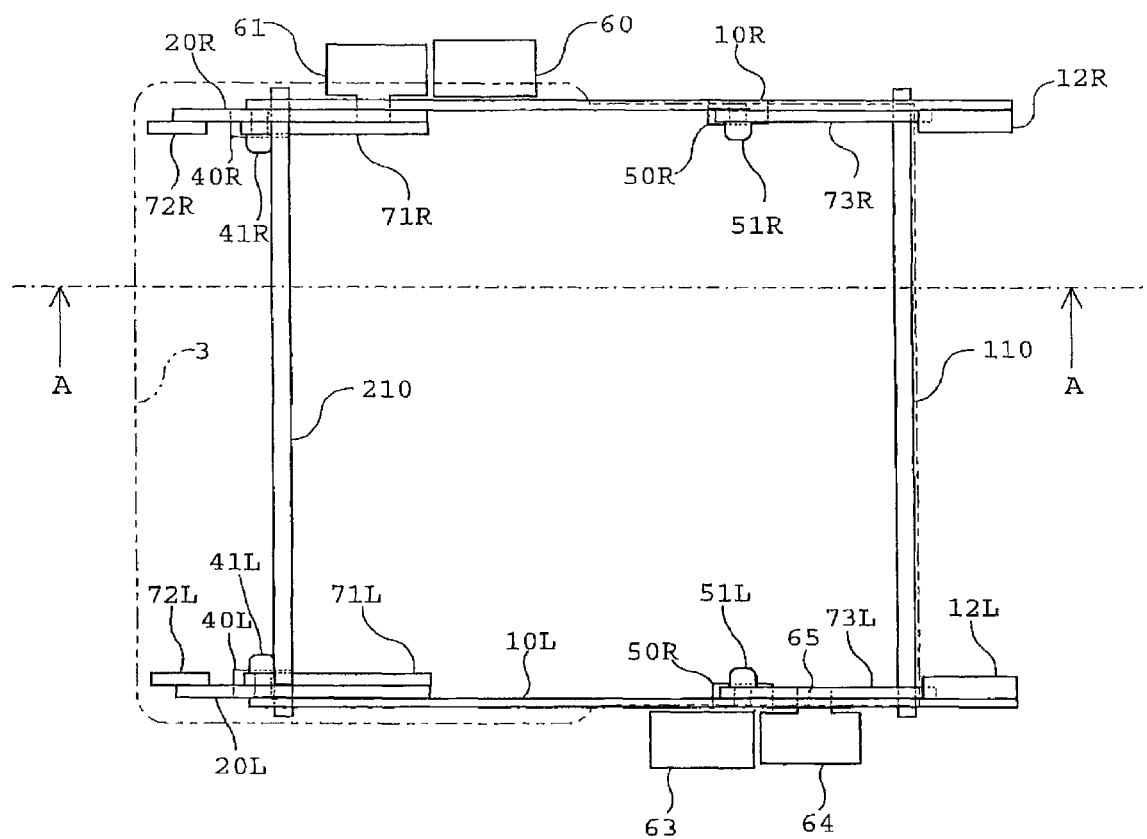
FIG. 2 is a top view showing the interior structure of a seat cushion of the vehicle seat device in the embodiment according to the present invention.
Figure 3:
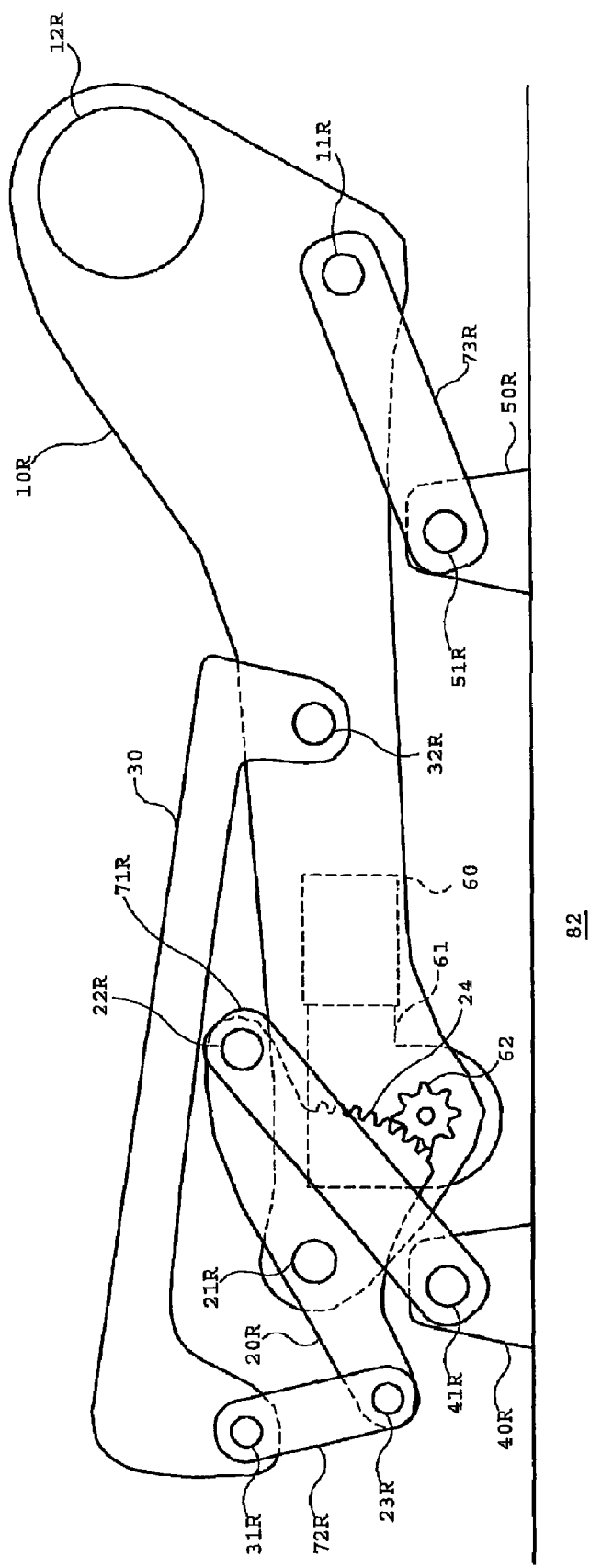
FIG. 3 is a schematic sectional view taken along the line A-A in FIG. 2.

The flank holding members 1 comprise outer cover members 13 and flank brackets 10 arranged inside thereof (R, L: Similar members are arranged at the left and right of the seat. Members at the left and right are distinguished from each other by adding R and L if need be. It is occasionally the case that other members are likewise distinguished from each other by adding R and L if need be.) (FIGS. 1 and 2). Rotational links 20 are secured to front support pins 21 which are rotatably supported at front portions of the flank brackets 10 (FIGS. 2 and 3). The rotational links 20 are members provided with first joint portions 22 and second joint portions 23 which are respectively at generally rear and front sides with respect to rotational centers provided on the flank brackets 10 when the seat cushion 3 is positioned at the lowest position. The rotational link 20R is provided with a sector gear 24 formed to take a shape that expands from the rotational center toward the vehicle rearward side. The front support pins 21 secured to the rotational links 20R and 20L are coupled by a transmission rod 210.

The rotational links 20 are pivotably coupled at the first joint portions 22 to the floor attached front brackets 40 through front swing links 71. And, the second joint portions 23 are pivotably coupled by means of front support pins 31 to front end portions of cushion frames 30 arranged inside the seat cushion 3, through cushion frame swing links 72. Pivot points 41 of the floor attached front brackets 40 are provided to take vehicle forward sides ahead of the first joint portions 22 of the rotational links 20 when the seat cushion 3 is adjusted to be at the lowest position, whereas the front support pins 31 which are pivot points for the cushion frame swing links 72 on the cushion frames 30 are approximately the same as the second joint portions 23 of the rotational links 20 in the position in the vehicle forward-rearward direction. The cushion frames 30 are pivotably coupled by means of rear support pins 32 provided at rear portions thereof, to center portions in the forward-rearward direction of the flank brackets 10.

The flank bracket 10R has secured thereto a front drive device 60-62 which mainly moves a front portion of the seat cushion 3 up and down by rotating the rotational link 20R. The front drive device is secured to an outside of the flank bracket 10R on the vehicle rearward side of the rotational link 20R. Because the flank brackets 10 are smaller in moving range compared with the rotational links 20, arranging the front drive device 60-62 on the flank bracket 10R makes smaller the space which is set taking the movement of the front drive device 60-62 into consideration. The front drive device 60-62 comprises a motor 60, a reduction mechanism 61 and a pinion gear 62. The output of the motor 60 is transmitted to the pinion gear 62 through the reduction mechanism 61. The pinion gear 62 meshes with the sector gear 24 of the rotational link 20R. The reduction mechanism 61 is a mechanism which inputs the output of the motor 60 to a worm gear (not shown) and outputs the motor output at a speed reduced by a worm wheel (not shown) meshing therewith.

The flank brackets 10 are pivotably coupled by rear support pins 11 provided at the rear portions to the floor attachment rear brackets 50 through rear swing links 73. Pivot points 51 of the floor attached rear brackets 50 are provided to take vehicle forward sides ahead of the rear support pins 11 on the flank brackets 10 when the seat cushion 3 is adjusted to be at the lowest position. The rear swing link 73L is provided with a sector gear (not shown) which is formed to take the rear support pin 11L as a center. As shown in FIG. 2, the rear support pins 11 which are secured to the rear swing links 73R and 73L and which are rotatably supported respectively by the flank brackets 10R and 10L are coupled by a transmission rod 110. The flank bracket 10L has secured thereto a rear drive device 63-65 which moves a rear portion of the seat cushion 3 up and down by swinging the rear swing link 73L. The rear drive device 63-65 comprises a motor 63, a reduction mechanism 64 and a pinion gear 65. The output of the motor 63 is transmitted to the pinion gear 65 through the reduction mechanism 64. The pinion gear 65 meshes with the sector gear of the rear swing link 73L. The reduction mechanism 64 has the same mechanism as the reduction mechanism 61. The flank brackets 10 hold a seatback frame (not shown) through a reclining mechanism 12.

(Operation)

Vertical Movement Adjustment of Seat Cushion Front Portion

When the motor 60 of the front drive device is rotated, the pinion gear 62 is rotated through the reduction mechanism 61. When the pinion gear 62 is rotated counterclockwise as viewed in FIG. 3, the sector gear 24 meshing therewith causes the rotational link 20R to rotate clockwise about the rotational center being the front support pin 21R. The rotational link 20R and the rotational link 20L are coupled by the transmission rod 210 and thus are rotated bodily. Therefore, the left and right mechanisms are same in the following operations. Upon clockwise rotation, the rotational links 20 push the floor attached front brackets 40 downward through the front swing links 71 coupled at the first joint portions 22. However, since the upper rails 82 cannot be moved downward, the rotational links 20 are pushed upward conversely, and as a result, the front support pins 21 on the flank brackets 10 are pushed upward. Although being coupled by the rear support pins 11 to the rear swing links 73, the flank brackets 10 are restricted by the rear drive device from being swung about the rear support pins 11 which are coupling portions to the rear swing links 73, and hence, are swung about the rotational center being a pivot point 51 between the rear swing links 73 and the floor attached rear brackets 50. Accordingly, the flank brackets 10 and the rear swing links 73 are bodily rotated clockwise.

Further, the rotations of the rotational links 20 cause the front support pins 31 on the cushion frames 30 to be pushed upward through the cushion frame swing links 72 connected to the second joint portions 23. Because of being held on the flank brackets 10 by means of the rear support pins 32, the cushion frames 30 are rotated clockwise about the rotational center of the rear support pins 32 as a result of the front support pins 31 being pushed upward.

Figure 4:
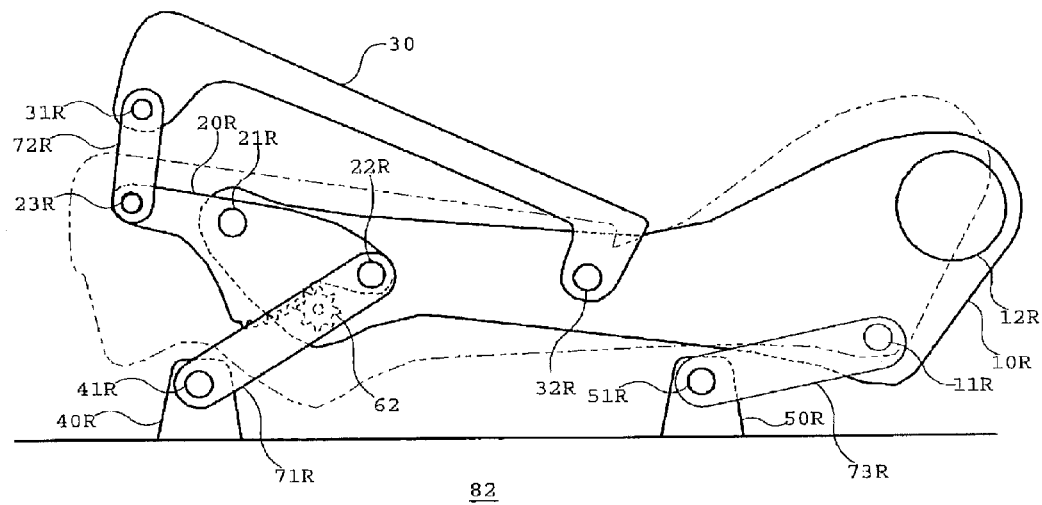
FIG. 4 is a schematic sectional view showing the state that the vehicle seat device in the embodiment according to the present invention has been operated from the state show in FIG. 3 (clockwise rotation of rotational links).

As described above, relative to the flank brackets 10 being rotated clockwise, the cushion frames 30 are further rotated clockwise, whereby the front portions thereof are raised (the portion indicated by the solid line in FIG. 4 and the portion indicated by the two-dot-chain line in FIG. 1). Regarding the ratio at which the flank brackets 10 and the cushion frames 30 are respectively rotated, it is possible to set an appropriate ratio of the rotational angles by adjusting the length from the rotational center (the front support pins 21) of the rotational links 20 to the first joint portions 22 and the length from the rotational center to the second joint portions 23.

When the motor 60 is rotated in an opposite direction, the pinion gear 62 is rotated clockwise, as viewed in FIG. 3. Thus, the rotational links 20, the flank brackets 10 and the cushion frames 30 are rotated in respective directions opposite to those directions as aforementioned, whereby the front portions of the cushion frames 30 are lowered conversely.

Vertical Adjustment of Entire Seat Cushion

When the motor 63 of the rear drive device is rotated, the pinion gear 65 is rotated through the reduction mechanism 64. When the pinion gear 65 is rotated clockwise as viewed from the left of the vehicle seat device, the sector gear meshing therewith causes the rear swing links 73L to rotate counterclockwise about the rotational center being the rear support pin 11L on the flank bracket 10L. The reward swing link 73L and the rear swing link 73R are coupled by the transmission rod 110 and are rotated bodily. Therefore, the left and right mechanisms are same in the following operations.

When the rear swing links 73 are rotated counterclockwise, the rear swing links 73 make a large angle with the flank brackets 10. Because the rotation of the rotational links 20 are restricted by the pinion gear 62, those that are able to rotate freely upon rotation of the rear swing links 73 about the rotational center of the rear support pins 11 are three points which include the first joint portions 22 on the rotational links 20, the pivot points 41 on the floor attached front brackets 40 and the pivot points 51 on the follow attached rear brackets 50. In a four-link mechanism which is formed to take as rotational centers four points made by adding the rear support pins 11 to the three points, as the rear swing links 73 are rotated counterclockwise, the front swing links 71 are also rotated counterclockwise. Thus, the flank brackets 10 are moved upward at both of the front and rear portions, whereby the entire cushion frames 30 are raised (the portion indicated by the solid line in FIG. 5).

When the motor 63 is rotated in an opposite direction, the pinion gear 65 is rotated counterclockwise. Then, the rear swing links 73 and the front swing links 71 are rotated in a direction opposite to the foregoing direction, and thus, the position of the cushion frames 30 is lowered in its entirety.

Figure 5:
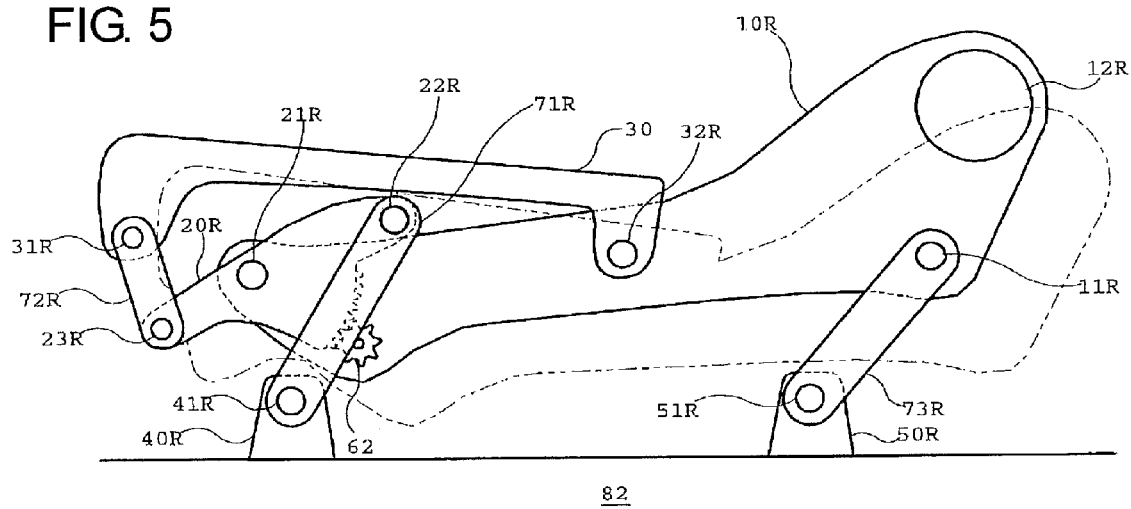
FIG. 5 is a schematic sectional view showing the state that the vehicle seat device in the embodiment according to the present invention has been operated from the state show in FIG. 3 (counterclockwise rotation of rear swing links).

In this way, when the motor 60 of the front drive device is rotated to rotate the pinion gear 62 counterclockwise as viewed in FIG. 5 in the state that each cushion frame 30 is raised in its entirety, the rotational link 20R is rotated clockwise about the rotational center being the front support pin 21R through the sector gear 24 meshing with the pinion gear 62. In this case, as mentioned earlier, the rotations of the rotational links 20 cause the floor attached front brackets 40 to be pushed downward through the front swing links 71 connected to the first joint portions 22, and as a result, the front support pins 21 of the flank brackets 10 are pushed upward, whereby the flank brackets 10 are swung about the rotational center of the pivot points 51 between the rear swing links 73 and the floor attached rear brackets 50. Accordingly, the flank brackets 10 and the rear swing links 73 are bodily rotated clockwise.

Figure 6:
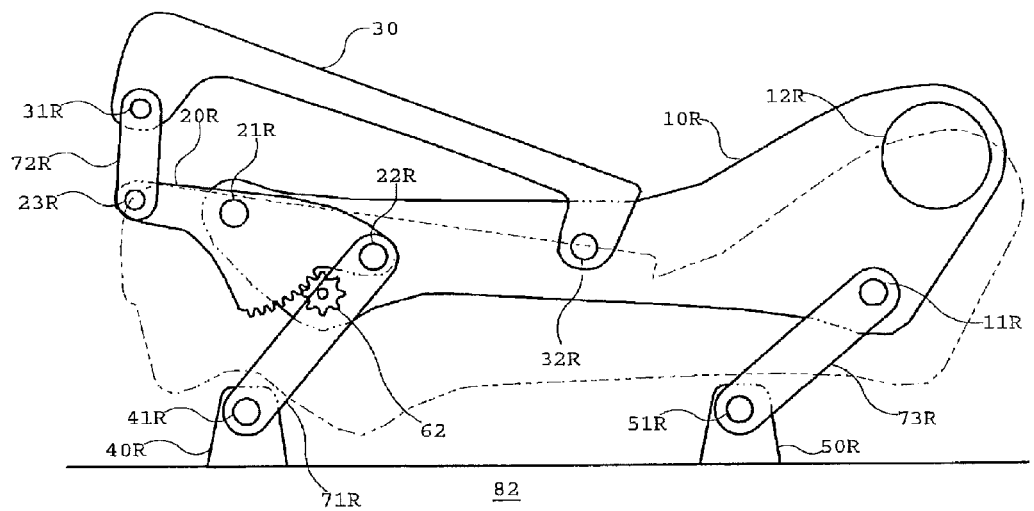
FIG. 6 is a schematic sectional view showing the state that the vehicle seat device in the embodiment according to the present invention has been operated from the state show in FIG. 5 (clockwise rotation of the rotational links).

Then, the rotations of the rotational links 20 cause the front support pins 31 on the cushion frames 30 to be pushed upward through the cushion frame swing links 72 connected to the second joint portions 23, whereby the cushion frames 30 are rotated clockwise about the rotational center of the rear support pins 32 (FIG. 6).

Other Modifications

Although the embodiment of the present invention has been described hereinabove, the present invention is not limited to the foregoing embodiment, and it is needless to say that various modifications are possible without departing from the gist of the present invention described in the claims. For example, it is possible to effect relative rotation between the flank brackets 10 and the rear swing links 73 by operating the motor 63 of the rear drive device in connection with the operation of the motor 60 of the front drive device when the motor 60 is rotated. This is because there is a situation that a comfortable feeling in use can be given to the user by operating the rear drive device together even when the user attempts to move the front portions only of the cushion frames 30 up and down. Particularly, it is exemplified that the following forms can be employed.

Figure 7:
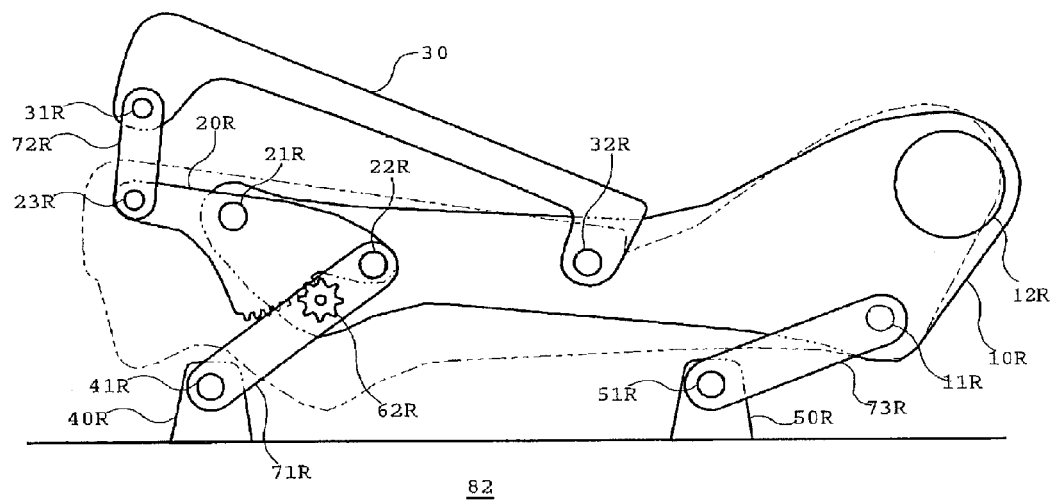
FIG. 7 is a schematic sectional view showing the state that the vehicle seat device in the embodiment according to the present invention has been operated from the state show in FIG. 3 (clockwise rotation of the rotational links).

When the front portions of the cushion frames 30 are lifted up by rotating the rotational links 20 through the rotation of the motor 60 of the front drive device, the restriction between the flank brackets 10 and the rear swing links 73 is given by the pinion gear 65, and hence, the flank brackets 10 and the rear swing links 73 are rotated about the rotational center of the pivot points 51 at the lower end portions of the rear swing links 73 regardless of the angle which is made therebetween. Thus, the rear swing links 73 are rotated clockwise, whereby the rear portions of the flank brackets 10 (i.e., the rear portions of the cushion frames 30) are lowered a little. That is, since the rear portions of the cushion frames 30 are lowered when the front portions of the cushion frames 30 are attempted to be lifted up, it is supposed that an uncomfortable feeling is likely to be given to the user. Further, when it is attempted to lower the front portions of the cushion frames 30, the rear portions of the cushion frames 30 are lifted up as a result of the foregoing operations performed conversely. Therefore, when the rotational links 20 are rotated, it is possible to prevent the rear portions of the flank brackets 10 (i.e., the rear portions of the cushion frames 30) from being lowered (being raised) (FIG. 7) by rotating the motor 63 of the rear drive device to rotate the rear swing links 73 counterclockwise (clockwise) in dependence on the degree to which the flank brackets 10 are rotated clockwise (counterclockwise). In this case, the degree to which the motor 63 of the rear drive device is operated can be linked with the operation of the front drive device so that the coupling portions (the portions at the rear support pins 32) between the rear portions of the cushion frames 30 and the flank brackets 10 are made to be small in vertical movement.

Besides, it is also possible to make the couplings between the first joint portions 22 of the rotational links 20 and the pivot points 41 on the floor attached front brackets 40 without using the front swing links 71. In this case, the first joint portions 22 of the rotational links 20 are provided with connection pins, whereas the floor attached front brackets 40 are provided with elongate holes which extend in the forward-rearward direction for the connection pins to be slidable therealong. The positional differences in the forward-rearward direction which take place at the connection portions between the rotational links 20 and the floor attached front brackets 40 upon rotation of the rotational links 20 are absorbed by the elongate holes which are provided on the floor attached front brackets 40. Since the elongate holes are provided in the forward-rearward direction, the vertical forces transmitted from the rotational links 20 are transmitted as they are to the floor attached front brackets 40. The elongate holes may be provided not on the floor attached front brackets 40 but on the rotational links 20. In this case, the floor attached front brackets 40 are provided with the connection pins, whereas the rotational links 20 are provided with the elongate holes extending in a radial direction.

It is also possible to make the couplings between the second joint portions 23 of the rotational links 20 and the front support pins 31 on the cushion frames 30 without using the cushion frame swing links 72. In this case, the second joint portions 23 of the rotational links 20 are provided with connection pins, whereas the cushion frames 30 are provided with elongate holes which extend in the forward-rearward direction for the connection pins to be slidable therealong. The positional differences in the forward-rearward direction which take place at the connection portions between the rotational links 20 and the cushion frames 30 upon rotation of the rotational links 20 are absorbed by the elongate holes which are provided on the cushion frames 30. Since the elongate holes are provided in the forward-rearward direction, the vertical forces transmitted from the rotational links 20 are transmitted as they are to the cushion frames 30. The elongate holes may be provided not on the cushion frames 30 but on the rotational links 20. In this case, the cushion frames 30 are provided with the connection pins, whereas the rotational links 20 are provided with the elongate holes extending in a radial direction.

INDUSTRIAL APPLICABILITY

According to the present invention, by providing features to rotational links which are employed to realize a tilt mechanism for a cushion of a vehicle seat device, it becomes possible to realize improvement in rigidity, downsizing, and improvement in the quality of external appearance.

The invention claimed is:

1. A vehicle seat device comprising:
flank brackets adapted to support a seat cushion and rotatably coupled at rear portions to floor attached rear brackets;
rotational links rotatably supported at center portions on front portions of the flank brackets;
a front drive device for relatively rotating the rotational links relative to the flank brackets;
cushion frames for the seat cushion, having rear end portions rotatably coupled to center portions of the flank brackets and having front end portions coupled to second joint portions ahead of the center portions of the rotational links to be restricted from movement in a vertical direction relative to the rotational links and to be relatively movable in a forward-rearward direction; and
floor attached front brackets having one end coupled to first joint portions behind the center portions of the rotational links to be restricted from movement in the vertical direction relative to the rotational links and to be relatively movable in the forward-rearward direction.

2. The vehicle seat device described in claim 1, wherein the second joint portions and the cushion frames are relatively rotatably coupled through cushion frame swing links.

3. The vehicle seat device described in claim 1, wherein the first joint portions and the floor attached front brackets are relatively rotatably coupled through front swing links.

4. The vehicle seat device described in claim 1, further comprising:
rear swing links rotatably coupled at one ends to the rear portions of the flank brackets and rotatably coupled at the other ends to the floor attached rear brackets in order to rotatably couple the rear portions of the flank brackets to the floor attached rear brackets; and
a rear drive device for relatively rotating the rear swing links relative to the flank brackets.

5. A vehicle seat device comprising:
flank brackets adapted to support a seat cushion and rotatably coupled at rear portions to floor attached rear brackets;
rotational links rotatably supported at center portions on front portions of the flank brackets;
a front drive device for relatively rotating the rotational links relative to the flank brackets;
cushion frames for the seat cushion, having rear end portions rotatably coupled to center portions of the flank brackets and having front end portions coupled to second joint portions ahead of the center portions of the rotational links to be restricted from movement in a vertical direction relative to the rotational links and to be relatively movable in a forward-rearward direction;
floor attached front brackets having one end coupled to first joint portions of the rotational links behind the center portions of the rotational links to be restricted from movement in the vertical direction relative to the rotational links and to be relatively movable in the forward-rearward direction;
rear swing links rotatably coupled at one ends to the rear portions of the flank brackets and rotatably coupled at the other ends to the floor attached rear brackets in order to rotatably couple the rear portions of the flank brackets to the floor attached rear brackets; and
a rear drive device for relatively rotating the rear swing links relative to the flank brackets;
wherein the rear drive device is configured to relatively rotate the rear swing links relative to the flank brackets in connection with the operation of the front drive device.

6. The vehicle seat device described in claim 5, wherein the rear drive device is configured to operate in connection with the operation of the front drive device to diminish the vertical movements of coupling portions between the rear end portions of the cushion frames and the flank brackets.

7. The vehicle seat device described in claim 1, wherein the center portions of the flank brackets where the cushion frames are rotatably coupled are spaced at a distance horizontally from the rear portions of the flank brackets that are rotatably coupled to the floor attached rear brackets.

8. The vehicle seat device described in claim 1, wherein the rear portions of the flank brackets are rotatably coupled to the floor attached rear brackets by way of rear swing links which are rotatably supported on the flank brackets at first support pins, the rear end portions of the cushion frames being rotatably coupled to the center portions of the flank brackets by second supporting pins which are positioned ahead of the first supporting pins.

9. A vehicle seat device comprising:
flank brackets adapted to support a seat cushion and having rear portions rotatably coupled at first support pins to floor attached rear brackets;
rotational links rotatably supported at center portions on front portions of the flank brackets;
a front drive device for relatively rotating the rotational links relative to the flank brackets;
cushion frames for the seat cushion, the cushion frames having rear end portions rotatably coupled to center portions of the flank brackets at second support pins positioned ahead of the first support pins, the cushion frames having front end portions coupled to second joint portions of the rotational links ahead of the center portions of the rotational links to be restricted from movement in a vertical direction relative to the rotational links and to be relatively movable in a forward-rearward direction; and
floor attached front brackets having one end coupled to first joint portions behind the center portions of the rotational links to be restricted from movement in the vertical direction relative to the rotational links and to be relatively movable in the forward-rearward direction.

10. The vehicle seat device described in claim 9, wherein the second joint portions and the front end portions of the cushion frames are relatively rotatably coupled by cushion frame swing links.

11. The vehicle seat device described in claim 9, wherein the first joint portions and the floor attached front brackets are relatively rotatably coupled by front swing links.

12. The vehicle seat device described in claim 9, further comprising:

rear swing links rotatably coupled at one ends to the rear portions of the flank brackets by the first support pins and rotatably coupled at the other ends to the floor attached rear brackets to rotatably couple the rear portions of the flank brackets to the floor attached rear brackets; and a rear drive device for relatively rotating the rear swing links relative to the flank brackets.

* * * * *